United States Patent
Qvintus et al.

(10) Patent No.: US 12,170,451 B2
(45) Date of Patent: Dec. 17, 2024

(54) METHOD FOR CONTROLLING BATTERY ENERGY STORAGE SYSTEM AND BATTERY ENERGY STORAGE SYSTEM

(71) Applicant: ABB Schweiz AG, Baden (CH)

(72) Inventors: Mikko Qvintus, Helsinki (FI); Samuli Ripatti, Helsinki (FI)

(73) Assignee: ABB Schweiz AG, Baden (CH)

( * ) Notice: Subject to any disclaimer, the term of this patent is extended or adjusted under 35 U.S.C. 154(b) by 558 days.

(21) Appl. No.: 17/593,532

(22) PCT Filed: Mar. 22, 2019

(86) PCT No.: PCT/EP2019/057210
§ 371 (c)(1),
(2) Date: Sep. 20, 2021

(87) PCT Pub. No.: WO2020/192861
PCT Pub. Date: Oct. 1, 2020

(65) Prior Publication Data
US 2022/0166231 A1    May 26, 2022

(51) Int. Cl.
*H02J 7/00*    (2006.01)
*H01M 10/48*    (2006.01)

(52) U.S. Cl.
CPC .......... *H02J 7/0019* (2013.01); *H02J 7/0048* (2020.01); *H01M 10/482* (2013.01); *H02J 2207/20* (2020.01)

(58) Field of Classification Search
None
See application file for complete search history.

(56) References Cited

U.S. PATENT DOCUMENTS

| 7,463,008 B2* | 12/2008 | Takahashi | H02J 7/0013 320/118 |
| 2012/0268070 A1* | 10/2012 | Park | H01M 10/441 320/126 |
| 2012/0274142 A1* | 11/2012 | Tinglow | H02J 7/0014 307/77 |

(Continued)

OTHER PUBLICATIONS

International Preliminary Report on Patentability: Application No. PCT/EP2019/057210; Issued: Feb. 23, 2021; 15 Pages.

(Continued)

*Primary Examiner* — Robert Grant
(74) *Attorney, Agent, or Firm* — Whitmyer IP Group LLC

(57) ABSTRACT

A method for controlling a battery energy storage system and a battery energy storage system including at least three battery energy storage units, a switching arrangement, and a control arrangement configured to select at least two battery energy storage units such that a sum of short circuit currents of the selected battery energy storage units is below a short circuit current limit, which is less than a sum of short circuit currents of the at least three battery energy storage units, and such that a sum of discharge or charge powers of the selected battery energy storage units equals to or exceeds a power limit, and such that states of charge of the selected battery energy storage units are within a determined range, and to control the switching arrangement to couple only the selected at least two battery energy storage units to a DC power connection.

16 Claims, 8 Drawing Sheets

(56) References Cited

U.S. PATENT DOCUMENTS

2016/0087421 A1 3/2016 Chatroux et al.
2017/0060113 A1 3/2017 Kaucic et al.

OTHER PUBLICATIONS

International Search Report and Written Opinion of the International Searching Authority; Application No. PCT/EP2019/057210; Completed: Oct. 19, 2021; Mailing Date: Nov. 11, 2019; 11 Pages.

\* cited by examiner

METHOD FOR CONTROLLING BATTERY ENERGY STORAGE SYSTEM AND BATTERY ENERGY STORAGE SYSTEM

TECHNICAL FIELD

The invention relates to a method for controlling a battery energy storage system, and to a battery energy storage system.

BACKGROUND

Battery energy storages (BES) are becoming more common and can be utilized in connection with grid connected photovoltaic systems, for example. Grid connected photovoltaic (PV) systems may require connecting an energy storage, such as a BES, in parallel with a PV generator to smoothen the naturally fluctuating PV output power. As the PV plant sizes in a utility scale become larger, the BES systems needed to smoothen the output may also grow to considerable sizes.

In order to design a large-scale BES system, single battery cells may need to be connected in series to get battery modules, which may have a voltage of e.g., tens to few hundreds of volts, and then these battery modules may be connected in series, forming a battery rack, to reach a voltage of e.g., 700-1500 Vdc, depending on the battery and system characteristics. If a voltage ceiling (e.g., 1500 Vdc) at the low voltage side is reached, then the only option to grow the BES system size may be to connect battery racks in parallel to raise the current output of the BES system. A typical battery rack energy capacity may vary from few tens of kWh to some hundreds of kWh, for instance. Thus, if an 8 MWh BES system is needed, for example, then 80 pieces of 100 kWh battery racks would be needed to be installed in parallel. One battery rack can, depending on the battery cell technology used, output about 5-10 kA of prospective short circuit current. Thus, an 8 MWh BES could output a prospective short circuit current of about 400-800 kA (DC), for instance. This level of short circuit current can produce massive forces to the downstream electrical components (such as bus bar systems, contactors, breakers, etc.), which level may not be withstood by such components. Battery racks may have an internal fuse protection to limit the output short circuit current of the battery rack to a level lower than the prospective short circuit current value. For example, a battery rack outputting a 10 kA prospective short circuit current could be limited to output only a 5-8 kA of short circuit current. However, this may still not be enough to limit the short circuit peak current level of a large-scale (e.g., >1 MWh) BES system to a level that is typically withstood by the downstream electrical components (e.g., 50-100 kA). A component current withstanding, expressed e.g. as a current rating, may generally indicate an ability of the structure of the component to stay intact and generally without any unacceptable damage (e.g. no deformation, cracks, loss of insulation level or any such behavior that could lead to a decrease in safety of the system). Sometimes the component current withstand may be a matter of verification level, for example, and thus the current withstanding level of a component can also refer to a type tested rated value of the component, for instance, even though the component could in practice stay intact with larger current values. The BES system is preferably designed to stay within the limits of the components used to build it, thus even a single component in the BES system could limit the allowed maximum short circuit current level, for example.

Battery racks may also have DC contactors to disconnect the battery racks from the downstream system, but such contactors typically can only connect/disconnect currents up to a nominal current or slightly (e.g., 1-3 times) larger current. Therefore, contactors may not be used for short circuit protection.

Due to a small internal inductance level of a battery rack, the electrical circuit of a BES system may have a very low L/R ratio, e.g., about 1-3 ms, which means that the short circuit current can reach the prospective current level very rapidly unless limited by some kind of short circuit protection device. Circuit breakers may not provide current limitation for such rapid current raises as they may have an operation time of e.g., about 30-50 ms. High speed semiconductor application fuses may be among some of the fastest acting short circuit protection devices, but even they may have difficulties in cutting off a high short circuit current to a level tolerable for the downstream devices. Solid state semiconductor devices (e.g., IGBTs or the like) may be able to act fast enough to limit the short circuit current before it raises to a level too high, but they typically need an electrical controller to operate the switching action of the semiconductor device and such an electrical controller may be prone to a failure and hence cannot be trusted as a sole protection device. Also, in comparison to passive protective devices, such as fuses, the solid-state semiconductor devices with their ancillary control equipment add complexity to the system and thus may be more expensive.

Thus, a problem exists that while high-capacity BES systems would be needed, the total energy capacity of a BES system may be limited by the short circuit current tolerance of components used in the BES system and/or connected to the BES system.

SUMMARY

The object of the invention is thus to provide a method and an apparatus for implementing the method so as to solve or at least alleviate the above problem or at least to provide an alternative solution. The object of the invention is achieved with a method, a computer program product, a battery energy storage system, and an electric system that are characterized by what is stated in the independent claims. Preferred embodiments of the invention are described in the dependent claims.

The invention is based on the idea of selecting two or more battery energy storage units from among a plurality of battery energy storage units of a BES system, such that a sum of short circuit currents of the selected battery energy storage units is below a short circuit current limit, which short circuit current limit is less than a sum of short circuit currents of said plurality of battery energy storage units, and connecting only the selected battery energy storage units to a DC power connection of the BES system.

An advantage of the solution of the invention is that the energy capacity of a BES system can be increased because the short circuit current available through the DC power connection of the BES system at a given time is limited to the sum of short circuit currents of the selected battery energy storage units. Thus, in practice by utilizing the disclosed solution the short circuit current limit does not limit e.g., the number of BES units that there can be in the BES system, which may then allow even tens of MWh of energy storage capacity, or more, to be available to a related electric power system.

BRIEF DESCRIPTION OF THE FIGURES

In the following, the invention will be described in more detail in connection with preferred embodiments and with reference to the accompanying drawings, in which.

DETAILED DESCRIPTION

The application of the invention is not limited to any specific system, but it can be used in connection with various electric systems. Moreover, the use of the invention is not limited to systems employing any specific fundamental frequency or any specific voltage level, for example.

Figure 1:
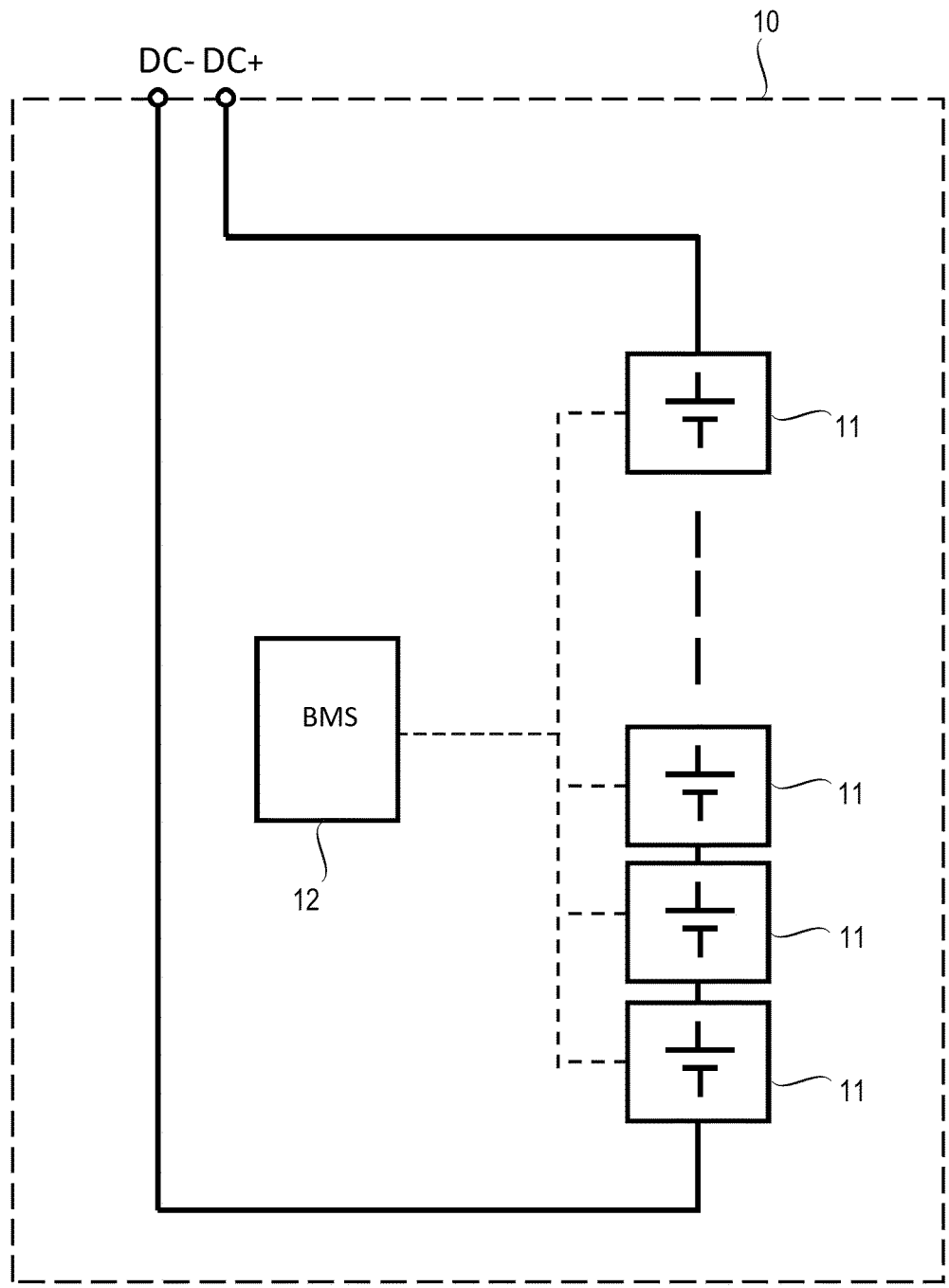
FIG. 1 illustrates an example of a battery energy storage according to an embodiment.

FIG. 1 illustrates a simplified example of a possible battery energy storage (BES) unit 10. The exemplary battery energy storage unit of FIG. 1 may comprise one or more battery modules 11 which can be connected in series and/or parallel with each other to provide a DC output DC+, DC− having desired voltage and power characteristics, for example. Each battery module 11 may comprise one or more battery cells. The battery cells can be any kind of rechargeable battery cells, such as lead-acid, nickel-cadmium (NiCd), nickel-metal hydride (NiMH), lithium-ion (Li-ion), and lithium-ion polymer (Li-ion polymer) battery cells or a combination of different types. An example of a battery energy storage unit 10 is a battery rack or two or more battery racks connected together. The exemplary battery energy storage unit 10 of FIG. 1 may further comprise a battery management system (BMS) 12 for managing and monitoring the battery modules 11, for instance. The BMS 12 can determine state of charge (SOC) and/or state of health (SOH) values for the battery energy storage unit 10 and/or take care of balancing of energy (voltages) of the individual cells within the energy storage unit 10, for example. A battery energy storage unit 10 could further comprise other components such as fuses and switches, for example. It should be noted that, apart from a physical unit, the term battery energy storage unit used herein can generally also refer to a logical unit comprised of two or more physical units, or parts thereof, linked together to operate as a unit.

Figure 2:
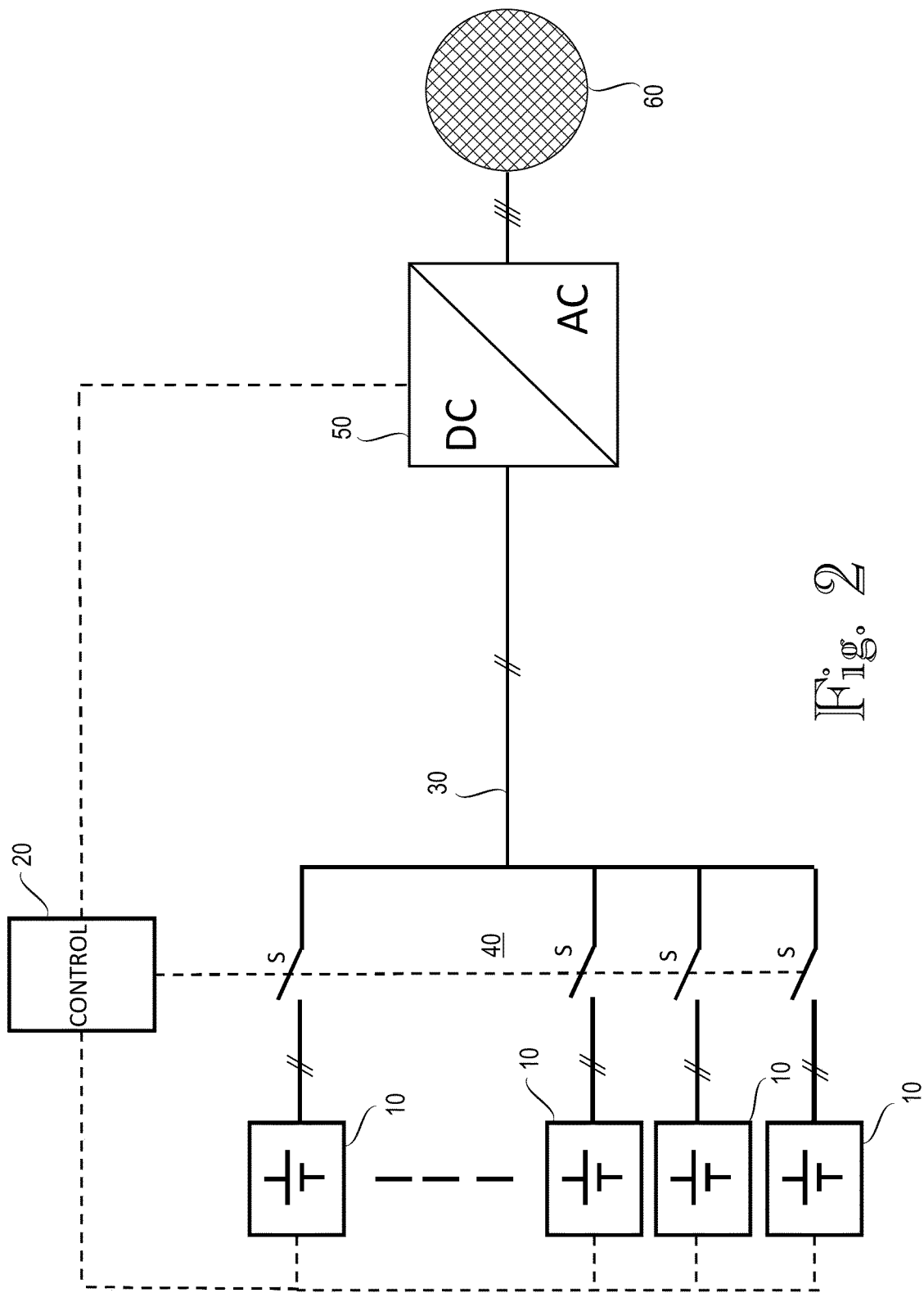
FIG. 2 illustrates an example of a battery energy storage system according to an embodiment.

FIG. 2 illustrates a simplified example of a battery energy storage system according to an embodiment. The figure shows only components relevant for understanding the operation of the battery energy storage system. The exemplary battery energy storage system comprises at least three battery energy storage units 10, a DC power connection 30 and a switching arrangement 40 provided between said at least three battery energy storage units 10 and the DC power connection 30. The switching arrangement 40 is preferably configured to be capable of coupling and decoupling individually each of said at least three battery energy storage units 10 to and from the DC power connection 30. The switching arrangement 40 may comprise one or more dedicated switches S for each of the battery energy storage units 10 whereby each of the battery energy storage units 10 can be electrically coupled and decoupled to and from the DC power connection 30 individually and separately from each other. The switches S may be any kind of switch devices capable of coupling and decoupling the battery energy storage units 10 to and from the DC power connection 30. Some examples of such switch devices include electrically controllable mechanical switches, such as electromechanical relays and contactors, circuit breakers, and solid-state, or semiconductor, switches, for instance. The switches S may be single-pole or two-pole switches, for instance. The DC power connection 30 can thus form a common DC power connection, such as a DC link, for all the battery energy storage units 10 via which they can be charged and discharged, for example. According to an embodiment, the switching arrangement 40 is configured to be capable of directly coupling and decoupling individually each of said at least three battery energy storage units 10 to and from the DC power connection 30. The term directly herein refers to a direct coupling without any power conversion, i.e., without any power converter devices, being involved in the coupling between an individual battery energy storage unit 10 and the DC power connection 30.

According to an embodiment, the battery energy storage system may comprise at least one electric power converter device connected to the DC power connection 30. The example of FIG. 2 shows a power converter device 50, which in this example is an inverter via which the DC power connection 30 can be connected to an AC system 60 such as an AC power network (grid), for example. Such an inverter 50 may be a single-stage inverter or a multi-stage inverter comprising two or more converter stages. There may be one or more switches (not shown) provided between the battery energy storage system and the AC network 60, enabling the connection and disconnection of the battery energy storage system to and from the AC network 60. There could be more than one power converter devices 50 connected to or included in the battery energy storage system. Moreover, such power converter devices may also include one or more DC-to-DC converters and/or transformers instead or in addition to an inverter, for example. Thus, the DC power connection 30 could also be connected to a DC power system, such as a DC power network (grid), either directly or via one or more DC-to-DC converters, for instance. The one or more power converter devices 50 interfacing the DC power connection 30 of the battery energy storage system to a DC or AC power system (e.g., grid) 60 are preferably bidirectional converters enabling electric power to be transferred in both directions. As a result, at least two modes of operation may exist: a discharge mode, in which electric power can be fed from the battery energy storage units 10 into a connected DC or AC power system 60, for instance, and a charge mode, in which electric power can be pulled from the connected DC or AC power system 60 and stored into the battery energy storage units 10.

The exemplary system of FIG. 2 further comprises a control arrangement for the battery energy storage system, which exemplary control arrangement comprises a control unit 20. There could be more than one such control units in the control arrangement. The functionality according to the various embodiments described herein may be implemented at least partly by means of the control unit 20. The control unit 20 may control the switches S of the switching arrangement 40 and may monitor the battery energy storage units 10, for instance. Moreover, the control unit 20 may further control and/or monitor the possible one or more power converter devices 50 connected to or included in the battery energy storage system, for example. The control unit 20 can also include at least some of the functionality of the BMS 12 of at least one or each of the battery energy storage units 10, instead of or in addition to the BMS within the battery energy storage units 10. Therefore, the controller 20 can, for example, determine SOC and/or SOH values for at least one or each battery energy storage unit 10 by measuring electrical quantities (e.g., current or voltage) for the respective battery energy storage units 10 (possible measurement devices not shown in the figures). While the exemplary control unit 20 is shown separately in the example of FIG. 2, it could be part of some other entity, such as the switching arrangement 40, for instance.

According to an embodiment, controlling of the battery energy storage system comprises selecting at least two battery energy storage units from among said at least three battery energy storage units 10 such that a sum of short circuit currents of the selected at least two battery energy storage units is below a short circuit current limit, wherein the short circuit current limit is less than a sum of short circuit currents of said at least three battery energy storage units of the battery energy storage system, and such that a sum of discharge powers or a sum of charge powers of the selected at least two battery energy storage units equals to or exceeds a power limit, and such that states of charge of the selected at least two battery energy storage units are within a determined range. According to an embodiment, the switching arrangement 40 is then controlled to couple only the selected at least two battery energy storage units 10 to the DC power connection 30. The determined range thus indicates a maximum range of variation of the state of charge of battery energy storage units used in the selecting. The term state of charge (SOC) generally refers to a charging state of a battery or battery unit, such as a battery energy storage unit 10, and is generally an indication of available capacity of the battery or battery unit expressed by any suitable way, such as a percentage (from 0% to 100%) of a full charge, for example. The state of charge can be determined by any suitable way and such determination may be based on a voltage and/or current information of the battery or battery unit, for example. In case of battery energy storage units 10, the state of charge of a battery energy storage unit may be obtained from a battery management system (BMS) 12 of the battery energy storage unit, for instance. According to an embodiment, the determined range for the state of charge may be determined separately for the charge mode of the battery energy storage units 11 and for the discharge mode of the battery energy storage units 11. Moreover, the determined range for the state of charge may be predetermined or actively determined, e.g., essentially continuously or periodically, for example. According to an embodiment, the short circuit current limit, which is less than a sum of short circuit currents of said at least three battery energy storage units, may be set based on a maximum current withstand level of the battery energy storage system and/or of one or more components connected thereto. According to an embodiment, the short circuit current limit is set to a level low enough such that in case of a short circuit situation, such as an external short circuit, the battery energy storage system and/or components directly connected thereto can withstand, i.e., are not damaged by, such level of the short circuit current. As an example, the short circuit current limit could be set below a maximum peak current withstand value of a power converter 50 if the power converter 50 has the lowest current withstand level. According to an embodiment, the power limit may be predetermined or actively determined, e.g., essentially continuously or periodically, for example.

The power limit may be set to correspond to a nominal power of the battery energy storage system and/or of a component directly connected thereto. The power limit may also be set according to possibly varying power need of, or a power capacity provided by a DC or AC power system 60 connected to the battery energy storage system, for example. Such a varying power limit, or at least information enabling a determination of the power limit, can be set, and transmitted to the controller 20 by a higher-level controller, such as a utility grid controller (not shown), of the DC or AC power system (e.g., grid) 60 to which the battery energy storage system is connected, for example.

According to an embodiment, the controlling of the battery energy storage system may further comprise monitoring states of charge of the selected at least two battery energy storage units 11 coupled to the DC power connection 30; and if the state of charge of at least one of the selected at least two battery energy storage units coupled to the DC power connection 30 is outside of the determined range, repeating the steps of selecting at least two battery energy storage units from among said at least three battery energy storage units and controlling the switching arrangement 40 to couple only the selected at least two battery energy storage units to the DC power connection 30. According to an embodiment, upon repeating the step of selecting at least two battery energy storage units from among said at least three battery energy storage units 10, the selecting comprises reselecting at least one previously selected battery energy storage unit having its state of charge within the determined range. According to an embodiment, upon repeating the step of controlling the switching arrangement 40 to couple only the selected at least two battery energy storage units to the DC power connection 30, controlling the switching arrangement 40 to keep at least one battery energy storage unit coupled to the DC power connection at all times during a transition from previously selected battery energy storage units to newly selected battery energy storage units. Such an operation of having at least one battery energy storage unit 10 connected to the DC power connection 30 at all times allows a continuous power flow between at least one of the battery energy storage units 10 and the DC power connection, which may be particularly important, for example, for keeping electrical quantities (e.g., active and reactive power levels, frequency, voltage) of the DC or AC power system 60 as stable as possible, for instance.

Figure 3:
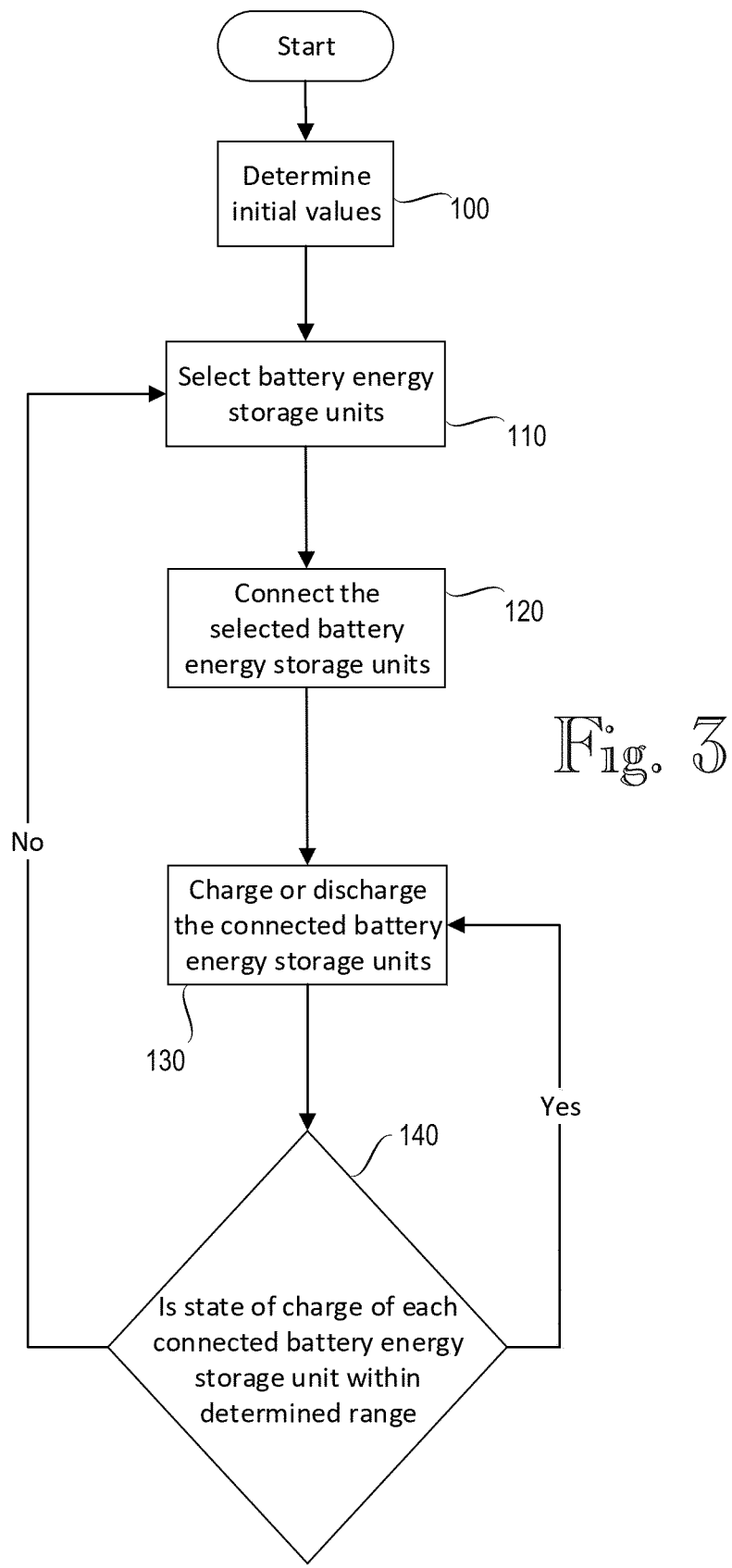
FIG. 3 illustrates a flow diagram according to an embodiment.

FIG. 3 illustrates an exemplary flow diagram according to an embodiment. Upon starting the controlling of the battery energy storage system, or thereafter, initial values for one or more parameters may be determined 100. Such determining 100 may comprise merely setting a value of a parameter to a predetermined value, if a predetermined value is to be used for the parameter in question. Such determining 100 may also comprise calculating an initial value for a parameter or obtaining, querying and/or receiving an initial value for a parameter from an entity external to the battery energy storage system, such as a higher-level control system. An example of such a higher-level control system is Supervisory Control and Data Acquisition (SCADA) system. Such a SCADA system may belong to and/or control a DC or AC power system (e.g., grid) 60 to which the battery energy storage system is connected, for instance. Some examples of possible parameters may comprise one or more of the following: a number of separate connectable BES units (#BES_total), a short circuit peak current of each BES unit (Isc,pk_BESn), a maximum/nominal output power of each BES unit (Pn_BESn), a state of charge (e.g. voltage) level of each BES unit (SOC_BESn), a maximum peak current withstand value of the power converter (Isc,ws_Conv), and the maximum range of variation of the state of charge for the BES units (SOC_Var,max). After the determining 100, at least two battery energy storage units are selected 110 from among the at least three battery energy storage units 10 such that the following three conditions are met: 1) the sum of short circuit currents of the selected at least two battery energy storage units is below a short circuit current limit, wherein the short circuit current limit is less than a sum of short circuit currents of said at least three battery energy storage units, 2) a sum of discharge powers or a sum of charge powers of the selected at least two battery energy storage units equals to or exceeds a power limit, and 3) states of charge of the selected at least two battery energy storage units are within a determined range. Then, in step 120 only the selected at least two battery energy storage units are connected to the DC power connection 30 by suitably controlling the switching arrangement 40. After connecting 120 the selected at least two battery energy storage units to the DC power connection 30, charging or discharging the connected at least two battery energy storage units, depending on the mode of operation, i.e., charge mode or discharge mode, can be started 130. In step 140, it is checked whether the states of charge of the selected at least two battery energy storage units 11 connected to the DC power connection 30 are within the determined range. Step 140 may be performed while charging or discharging the connected at least two battery energy storage units, for example. If the states of charge of the selected at least two battery energy storage units 11 connected to the DC power connection 30 are within the determined range, then the charging or discharging of the connected at least two battery energy storage units can continue. But if the states of charge of the selected at least two battery energy storage units 11 connected to the DC power connection 30 are not within the determined range, then steps 110 and 120 are repeated and charging or discharging of the newly selected and connected at least two battery energy storage units can be started 130.

Figure 4:
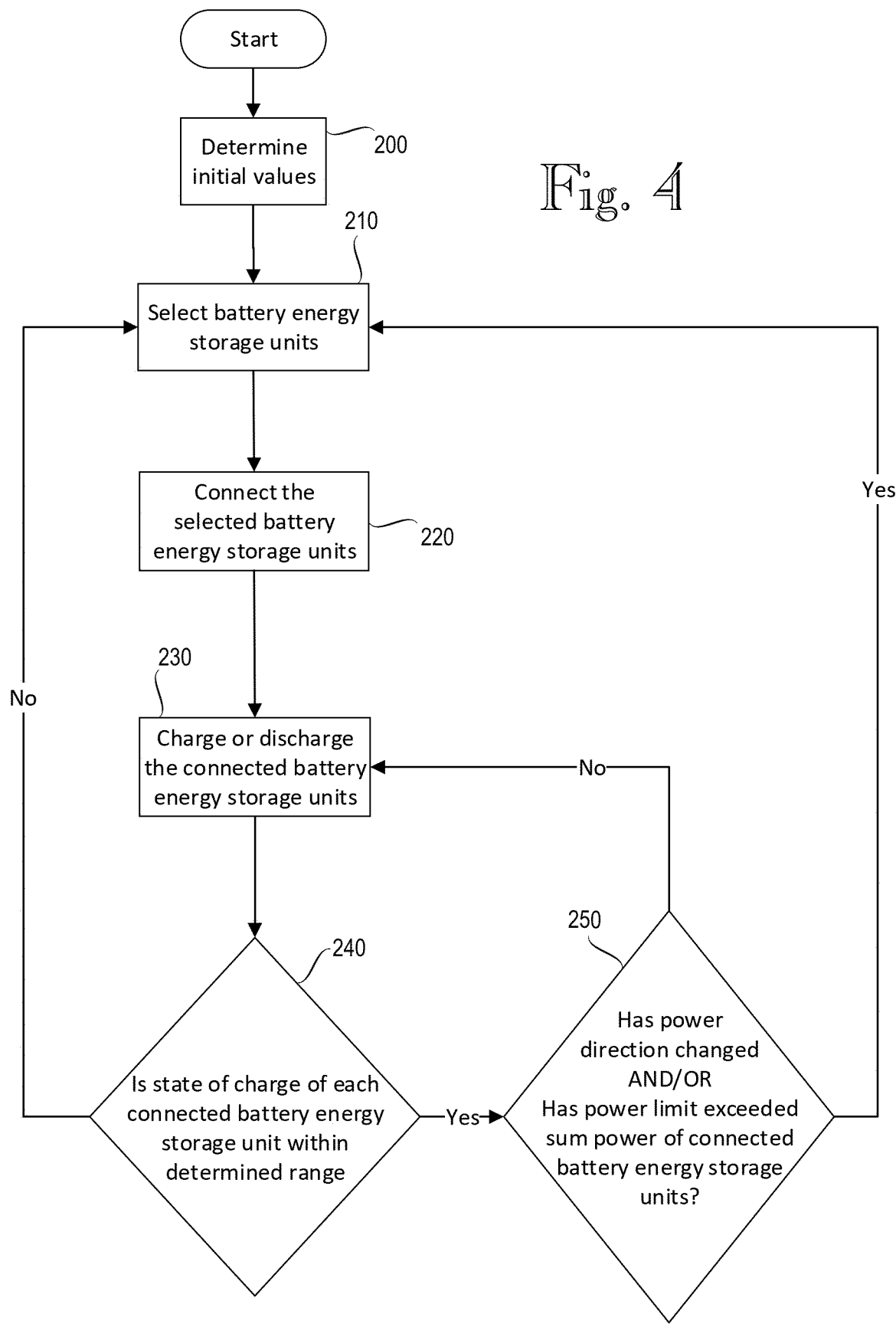
FIG. 4 illustrates a flow diagram according to an embodiment.

FIG. 4 illustrates an exemplary flow diagram according to another embodiment. Upon starting the controlling of the battery energy storage system, or thereafter, initial values for one or more parameters may be determined 200 similar to step 100 in the example of FIG. 3, for instance. After the determining 200, at least two battery energy storage units are selected 210 from among the at least three battery energy storage units 10 such that the following three conditions are met: 1) the sum of short circuit currents of the selected at least two battery energy storage units is below a short circuit current limit, wherein the short circuit current limit is less than a sum of short circuit currents of said at least three battery energy storage units, 2) a sum of discharge powers or a sum of charge powers of the selected at least two battery energy storage units equals to or exceeds a power limit, and 3) states of charge of the selected at least two battery energy storage units are within a determined range. Then, in step 220 only the selected at least two battery energy storage units are connected to the DC power connection 30 by suitably controlling the switching arrangement 40. After connecting 220 the selected at least two battery energy storage units to the DC power connection 30, charging or discharging the connected at least two battery energy storage units, depending on the mode of operation, i.e., charge mode or discharge mode, can be started 230. In step 240, it is checked whether the states of charge of the selected at least two battery energy storage units 11 connected to the DC power connection 30 are within the determined range. Step 240 may be performed while charging or discharging the connected at least two battery energy storage units, for example. If the states of charge of the selected at least two battery energy storage units 11 connected to the DC power connection 30 are within the determined range, then an additional check or checks is/are made 250 whether a power direction has changed and/or whether the power limit has exceeded the sum of discharge powers or the sum of charge powers of the selected and connected at least two battery energy storage units. If not, then the charging or discharging of the connected at least two battery energy storage units can continue. But if the power direction has changed and/or the power limit has exceeded the sum of the discharge powers or the sum of the charge powers of the selected and connected at least two battery energy storage units, then steps 210 and 220 are repeated and charging or discharging of the newly selected and connected at least two battery energy storage units is started 230. Also if the states of charge of the selected at least two battery energy storage units 11 connected to the DC power connection 30 are not within the determined range in step 240, then steps 210 and 220 are repeated and charging or discharging of the newly selected and connected at least two battery energy storage units is started 230.

Figure 5:
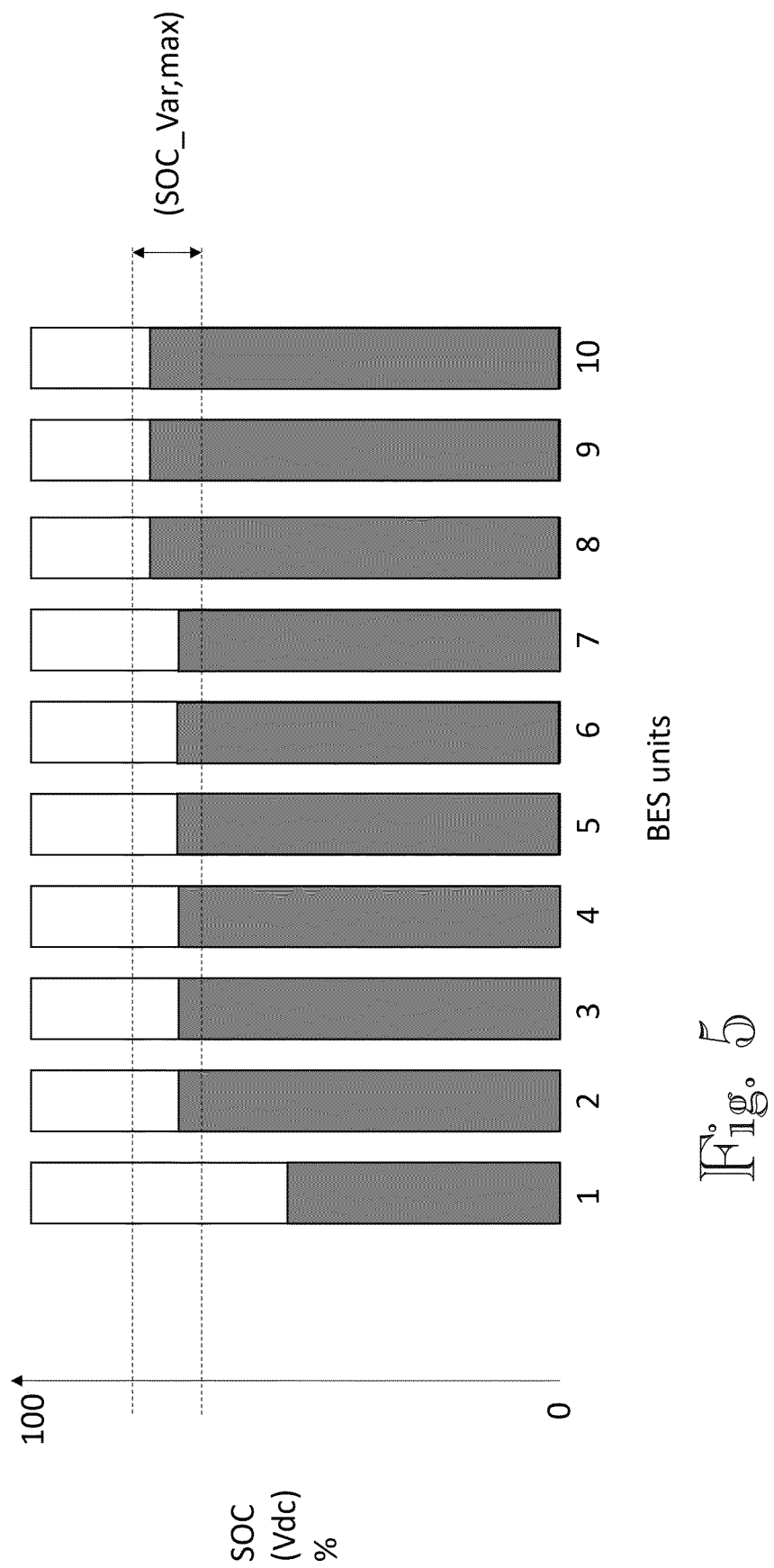
FIG. 5 illustrates a diagram according to an embodiment.
Figure 6:
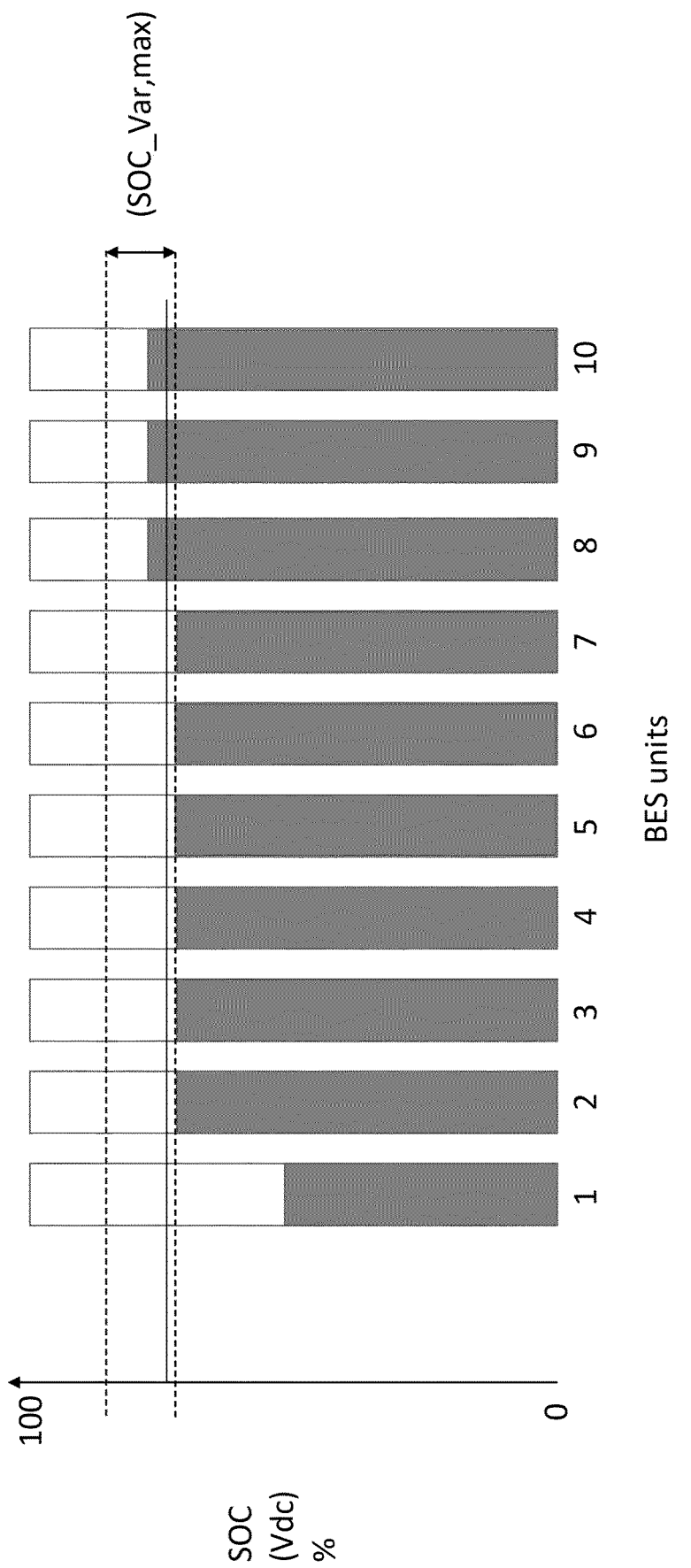
FIG. 6 illustrates a diagram according to an embodiment.
Figure 7:
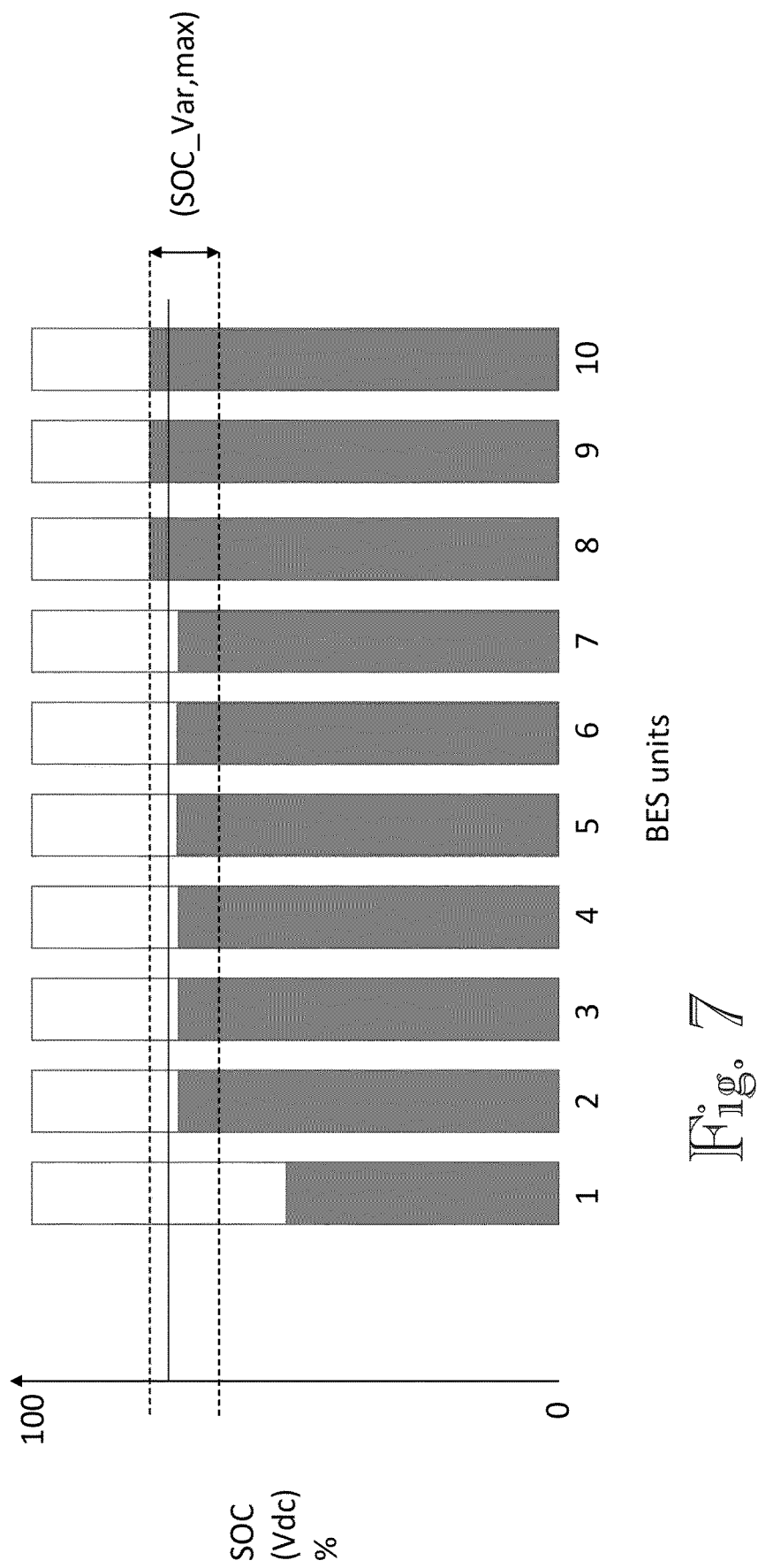
FIG. 7 illustrates a diagram according to an embodiment.
Figure 8:
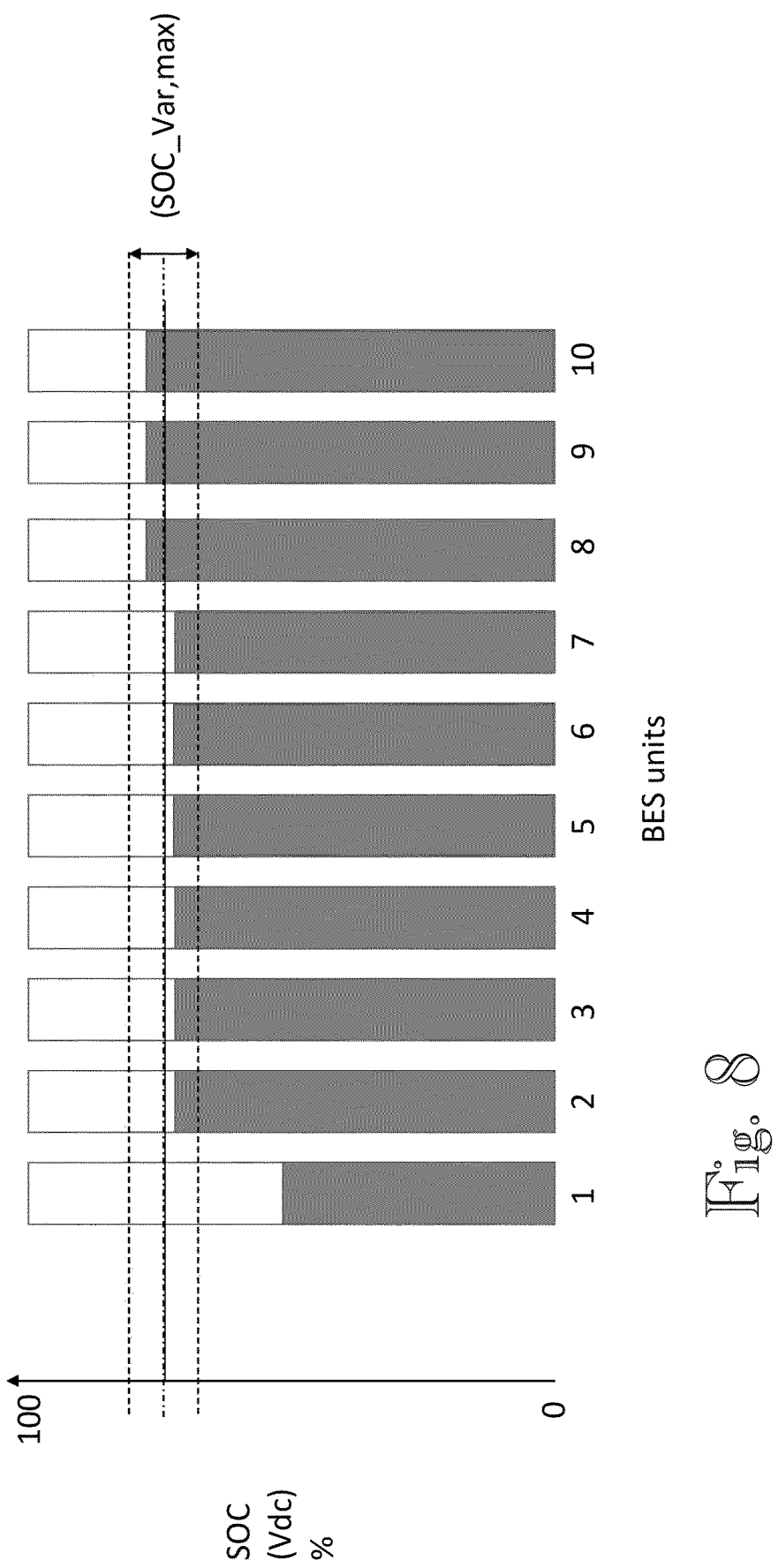
FIG. 8 illustrates a diagram according to an embodiment.

FIG. 5 illustrates an exemplary diagram of states of charge (SOC) of ten (1 to 10) battery energy storage (BES) units, indicated as a percentage of a full charge (100%) of the BES unit in question, which may be based on a voltage Vdc of the BES unit, for example. The diagram also illustrates an example of the maximum range of variation of the state of charge for the BES units (SOC_Var,max). In the example, BES units 2 to 10 have their SOC values within range SOC_Var,max, while BES unit 1 has a SOC value outside range SOC_Var,max. Hence, in this example, when range SOC_Var,max represents the determined range, BES units 2 to 10 would meet the criterion of having their states of charge within the determined range. According to an embodiment the maximum range of variation of the state of charge for the BES units (SOC_Var,max) could be represented or predetermined by a single value which indicates the length of the range, i.e. the difference between the maximum and the minimum value of the range. In this case the position of the range could vary and depend on the SOC values of the BES units 10. According to another embodiment, the maximum range of variation of the state of charge for the BES units (SOC_Var,max) could be represented by at least two values which indicate both the length of the range and the position of the range. Such at least two values could comprise the maximum value and the minimum value of the range, for example. Alternatively, such at least two values could comprise the length of the range and any one of the maximum value of the range, the minimum value of the range, and the median of the range, for instance. FIG. 6 illustrates another exemplary diagram of states of charge (SOC) of ten (1 to 10) battery energy storage (BES) units and of the maximum range of variation of the state of charge for the BES units (SOC_Var,max). The solid line within range SOC_Var,max illustrates an average of the SOC values of the BES units. In this example the position of range SOC_Var,max is fixed and does not depend on the SOC values of the BES units. This kind of range SOC_Var,max could be used for the charge mode, for example. FIG. 7 illustrates another exemplary diagram of states of charge (SOC) of ten (1 to 10) battery energy storage (BES) units and of the maximum range of variation of the state of charge for the BES units (SOC_Var,max). The solid line within range SOC_Var,max illustrates an average of the SOC values of the BES units. Also, in this example the position of range SOC_Var,max is fixed. This kind of range SOC_Var,max could be used for the discharge mode, for example. FIG. 8 illustrates yet another exemplary diagram of states of charge (SOC) of ten (1 to 10) battery energy storage (BES) units and of the maximum range of variation of the state of charge for the BES units (SOC_Var,max). The solid line within range SOC_Var,max illustrates an average of the SOC values of the BES units. The dash-dotted line within range SOC_Var,max illustrates the median of range SOC_Var,max. This kind of range SOC_Var,max could be used for the charge mode or the discharge mode, for example.

According to an embodiment, the maximum range of variation of the state of charge for the BES units, SOC_Var, max, can be determined based on the electrical behaviour of the BES units 10 when being connected directly in parallel with each other, for example. As the BES units 10 will be directly (without inrush current limiting power conversion equipment in series) connected in parallel with each other, the inrush current of connecting two or more BES units having different SOC (e.g., voltage) value, can cause damage to the connecting devices (S). Thus, according to an embodiment, the SOC_Var,max is preferably chosen such that it allows the connection to be made without problems caused by the inrush current. According to an embodiment, when the length of range SOC_Var,max is expressed as percentage points, i.e. indicating how many percentage points, or p.p., the SOC values may differ from each other, the length of range SOC_Var,max may be any value between 0 and 50 p.p., preferably any value between 0 and 30 p.p., more preferably any value between 0 and 15 p.p. or between 0 and 5 p.p. The smaller the length of range SOC_Var,max value used, the more frequent switching operations may happen, and thus, in order to reduce wear of the switching components it may be preferable to use as high value for the length of range SOC_Var,max as allowed by the design, for example.

In order to further explain the operation according to some exemplary embodiments, an exemplary and not limiting case is now being described. Let's say there are 12 BES units 10 and each of them is initially charged to a SOC value of 50%. The BES units 10 are connected to an AC grid 60 via a power converter 50 having a nominal power rating equal to a power rating of three BES units, i.e., at least three BES units must be connected to the converter in order to be able to convey nominal power to either power direction (charging/discharging). By coincidence, the power converter 50 has a current withstand level equaling the short circuit current level of the sum of three BES units. Therefore, maximum of three BES units could be connected to the power converter at a given time. It has been determined (by means of simulation or testing or the like) that in order to guarantee safe operation for the switching devices S, the length of range SOC_Var,max must not exceed 10%, and 10% is thus chosen. The controller 20 of the BES system receives from a higher controller (e.g., utility grid SCADA) a request to take converter nominal power from the grid 60, thus the controller must initiate charging of the BES system. Now the controller 20 selects three BES units 10 from the available (all 12 units are within range SOC_Var,max) 12 BES group, and as the SOC values of each BES unit are equal, any of the BES units may be selected. At this point the controller 20 can use secondary selection criteria state of health (SOH) for selecting the BES units. SOH indicates the condition of the BES unit compared to its initial state of health. In order to maintain the loading of the BES units as equal as possible, it is preferable to select BES units with the highest SOH values at this point. Let's say the controller 20 selects the BES units 1, 2 and 3. Now that the selected three BES units fulfil the criteria (Sum of power of the BES units equals or exceed the power value for the converter, the sum of short circuit currents of the selected BES units does not exceed the current withstand value of the converter, and the selected BES units have the SOC value within the allowed maximum range SOC_Var,max, it is possible to initiate the power conveying, i.e. charging of the BES units according to the power request. In the initiation, range SOC_Var,max can be centered to an average value of the SOC values of the BES units. If the SOC values of certain units are too far (e.g. beyond range SOC_Var,max from the average SOC level) from the average level, they can be discarded from the list of available selectable BES units, and the average SOC value may be recalculated only based on the SOC values of the selectable BES units. As the selected BES units 1-3 are being charged, their SOC levels start to raise. At this point there are two alternative ways how to tie range SOC_Var, max to the SOC values of selectable BES units: according to the first alternative, while charging, the lower level of range SOC_Var,max can be tied to the lowest SOC level of the selectable BES units, the state of which is continuously (updated at chosen frequency or at the moment of specific event, such as upon reaching the variance limit value) updated, and while discharging, the highest value of range SOC_Var,max is tied to the highest SOC of the selectable BES units. According to the second alternative it is possible to update continuously (as in the case of first alternative) an average value of the SOC values of the selectable BES units, and tie it to the median of range SOC_Var,max. Let's say in the current exemplary case the selected BES units 1-3 have reached a SOC value of 55%, which is the highest SOC value possible if the median of range SOC_Var,max is tied to the average SOC value of the selectable BES units (50%), i.e. the SOC variance range covers +−5 p.p. from the 50% value. Alternatively the selected BES units 1-3 can be charged to SOC level of 60%, if range SOC_Var,max is tied to the lowest SOC value of the selectable BES units, i.e. +10 p.p. from the SOC value of 50%. While continuing to charge, at a moment when the highest SOC value of the selected BES units goes out of range SOC_Var,max (e.g. 60% if the first alternative is used), the controller 20 selects other BES units, for example units 4-6, which are at this point at a SOC level of 50%, and the charging continues with these BES units connected. By continuing as explained, the whole group of selectable BES units can be charged in a wave like manner to higher SOC levels by selecting only a portion of the BES units 10 at a given time and coupling them to the DC power connection 30. If the power direction request from the higher-level controller changes to discharge mode, then according to an embodiment, the BES units having the highest SOC levels from the selectable BES units are being selected, and the discharging can continue in a similar but opposite fashion.

If at any point one or more of the BES units cannot be chosen because their SOC values are not within range SOC_Var,max, they can be charged/discharged separately to re-enter range SOC_Var,max (either by the converter 50 or by a separate power converter/power balancer within the BES system, for example), or they may re-enter the range when the selectable BES group's SOC value comes near enough due to cyclic power (SOC) fluctuation of the BES system.

The control arrangement 20 or other means controlling the battery energy storage system, or cone or more components thereof, according to any one of the embodiments herein, or a combination thereof, may be implemented as one physical unit or as two or more separate physical units that are configured to implement the functionality of the various embodiments. Herein the term 'unit' generally refers to a physical or logical entity, such as a physical device or a part thereof or a software routine. The control arrangement 20 according to any one of the embodiments may be implemented at least partly by means of one or more computers or corresponding digital signal processing (DSP) equipment provided with suitable software, for example. Such a computer or digital signal processing equipment preferably comprises at least a working memory (RAM) providing storage area for arithmetical operations, and a central processing unit (CPU), such as a general-purpose digital signal processor. The CPU may comprise a set of registers, an arithmetic logic unit, and a control unit. The CPU control unit is controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the invention, or a part thereof, may further comprise suitable input means for receiving e.g., measurement and/or control data, and output means for outputting e.g., control or other data. It is also possible to use a specific integrated circuit or circuits, or discrete electric components and devices for implementing the functionality according to any one of the embodiments.

Present battery energy storage systems may comprise processors and memory that may be utilized in implementing the functionality according to the various embodiments described herein. Thus, at least some modifications and configurations required for implementing an embodiment in existing battery energy storage systems may be performed as software routines, which may be implemented as added or updated software routines. If at least part of the functionality of the invention is implemented by software, such software may be provided as a computer program product comprising computer program code which, when run on a computer, causes the computer or corresponding arrangement to perform the functionality according to the embodiments as described herein. Such a computer program code may be stored or generally embodied on a computer readable medium, such as suitable memory, e.g., a flash memory or an optical memory, from which it is loadable to the unit or units executing the program code. In addition, such a computer program code implementing the invention may be loaded to the unit or units executing the computer program code via a suitable data network, for example, and it may replace or update a possibly existing program code.

It is obvious to a person skilled in the art that as technology advances, the basic idea of the invention can be implemented in a variety of ways. Consequently, the invention and its embodiments are not restricted to the above examples, but can vary within the scope of the claims.

The invention claimed is:

1. A method for controlling a battery energy storage system comprising at least three battery energy storage units, a DC power connection and a switching arrangement provided between said at least three battery energy storage units and the DC power connection, wherein the switching arrangement is configured to couple and decouple individually each of said at least three battery energy storage units to and from the DC power connection, the method comprising:
   a) selecting a plurality of battery energy storage units from among said at least three battery energy storage units, the plurality of battery energy storage units being less than a total of said at least three battery energy storage units, wherein said selecting is performed:
      such that a sum of short circuit currents of the selected plurality of battery energy storage units is below a short circuit current limit, wherein the short circuit current limit is less than a sum of short circuit currents of said at least three battery energy storage units of the battery energy storage system and wherein the short circuit current limit is based on a peak current withstand level of the battery energy storage system and/or of a component connected thereto, and
      such that a sum of discharge powers or a sum of charge powers of the selected plurality of battery energy storage units equals to or exceeds a power limit, wherein the power limit corresponds to a power of the battery energy storage system and/or the component connected thereto, and
      such that states of charge of the selected plurality of battery energy storage units are within a determined range, which indicates a range of variation of the states of charge of the selected plurality at battery energy storage units;
   b) controlling the switching arrangement to couple only the selected plurality of battery energy storage units to the DC power connection; and
   c) after step b), starting a charging or discharging of the selected plurality of battery energy storage units coupled to the DC power connection.

2. The method of claim 1, wherein the determined range is determined separately for a charge mode of the battery energy storage units and for a discharge mode of the battery energy storage units.

3. The method of claim 1, comprising:
   monitoring states of charge of the selected plurality of battery energy storage units coupled to the DC power connection; and
   if the state of charge of at least one of the selected plurality of battery energy storage units coupled to the DC power connection is outside of the determined range, repeating steps a) and b).

4. The method of claim 3, wherein upon repeating step a), the selecting includes reselecting at least one previously selected battery energy storage unit having its state of charge within the determined range.

5. The method of claim 3, wherein upon repeating step b), controlling the switching arrangement to keep at least one battery energy storage unit coupled to the DC power connection at all times during a transition from previously selected battery energy storage units to newly selected battery energy storage units.

6. The method of claim 1, wherein the switching arrangement is configured to be capable of directly coupling and decoupling individually each of said at least three battery energy storage units to and from the DC power connection.

7. A computer program product comprising computer program code embodied on a non-transitory computer readable medium, wherein the program code is executable in a computer arranged to control a battery energy storage system, the battery energy storage system including at least three battery energy storage units, a DC power connection, and a switching arrangement provided between said at least three battery energy storage units and the DC power connection, wherein the switching arrangement is configured to couple and decouple individually each of said at least three battery energy storage units to and from the DC power connection, wherein execution of the program code causes the computer to:

select a plurality of battery energy storage units from among said at least three battery energy storage units, the plurality of battery energy storage units being less than a total of said at least three battery energy storage units, wherein said selection is performed:

such that a sum of short circuit currents of the selected plurality of battery energy storage units is below a short circuit current limit, wherein the short circuit current limit is less than a sum of short circuit currents of said at least three battery energy storage units of the battery energy storage system and wherein the short circuit current limit is based on a peak current withstand level of the battery energy storage system and/or of a component connected thereto, and such that a sum of discharge powers or a sum of charge powers of the selected plurality of battery energy storage units equals to or exceeds a power limit, wherein the power limit corresponds to a power of the battery energy storage system and/or the component connected thereto, and such that states of charge of the selected plurality of battery energy storage units are within a determined range, which indicates a range of variation of the states of charge of the selected plurality of battery energy storage units;

control the switching arrangement to couple only the selected plurality of battery energy storage units to the DC power connection; and after the coupling of the selected plurality of battery energy storage units to the DC power connection, control the battery energy storage system to start charging or discharging the selected plurality of battery energy storage units coupled to the DC power connection.

8. A battery energy storage system, comprising:
at least three battery energy storage units;
a DC power connection;
a switching arrangement provided between said at least three battery energy storage units and the DC power connection, wherein the switching arrangement is configured to couple and decouple individually each of said at least three battery energy storage units to and from the DC power connection, and
a control arrangement configured to:
a) select a plurality of battery energy storage units from among said at least three battery energy storage units, the plurality of battery energy storage units being less than a total of said at least three battery energy storage units, wherein said selecting is performed:

such that a sum of short circuit currents of the selected plurality of battery energy storage units is below a short circuit current limit, wherein the short circuit current limit is less than a sum of short circuit currents of said at least three battery energy storage units of the battery energy storage system and wherein the short circuit current limit is based on a peak current withstand level of the battery energy storage system and/or of a component connected thereto, and such that a sum of discharge powers or a sum of charge powers of the selected plurality of battery energy storage units equals to or exceeds a power limit, wherein the power limit corresponds to a power of the battery energy storage system and/or the component connected thereto, and such that states of charge of the selected plurality of battery energy storage units are within a determined range, which indicates a range of variation of the states of charge of the selected plurality of battery energy storage units; and b) control the switching arrangement to couple only the selected plurality of battery energy storage units to the DC power connection, and wherein the battery energy storage system is configured to start a charging or discharging of the selected plurality of battery energy storage units coupled to the DC power connection after the coupling of the selected plurality of battery energy storage units to the DC power connection.

9. The battery energy storage system of claim 8, wherein the determined range is determined separately for a charge mode of the battery energy storage units and for a discharge mode of the battery energy storage units.

10. The battery energy storage system of claim 8, wherein the control arrangement is configured to:
monitor states of charge of the selected plurality of battery energy storage units coupled to the DC power connection; and
if the state of charge of at least one of the selected plurality of battery energy storage units coupled to the DC power connection is outside of the determined range, repeat a) and b).

11. The battery energy storage system of claim 10, wherein upon repeating a), the control arrangement is configured to reselect at least one previously selected battery energy storage unit having its state of charge within the determined range.

12. The battery energy storage system of claim 10, wherein upon repeating step b), the control arrangement is configured to control the switching arrangement to keep at least one battery energy storage unit coupled to the DC power connection at all times during a transition from previously selected battery energy storage units to newly selected battery energy storage units.

13. The battery energy storage system of claim 8, wherein the switching arrangement is configured to be capable of directly coupling and decoupling individually each of said at least three battery energy storage units to and from the DC power connection.

14. The battery energy storage system of claim 8, comprising at least one electric power converter device connected to the DC power connection.

15. An electric system, comprising at least one battery energy storage system of claim 8, and an electric power network connected to said at least one battery energy storage system.

16. A device for controlling a battery energy storage system, which battery energy storage system comprises at least three battery energy storage units, a DC power connection, and a switching arrangement provided between said at least three battery energy storage units and the DC power connection, wherein the switching arrangement is configured to couple and decouple individually each of said at least three battery energy storage units to and from the DC power connection, the device comprising a processor, and a memory storing instructions that, when executed by the processor, cause the device to:
- select a plurality of battery energy storage units from among said at least three battery energy storage units, the plurality of battery energy storage units being less than a total of said at least three battery energy storage units, wherein said selecting is performed:
  - such that a sum of short circuit currents of the selected plurality of battery energy storage units is below a short circuit current limit, wherein the short circuit current limit is less than a sum of short circuit currents of said at least three battery energy storage units of the battery energy storage system and wherein the short circuit current limit is based on a peak current withstand level of the battery energy storage system and/or of a component connected thereto, and
  - such that a sum of discharge powers or a sum of charge powers of the selected plurality of battery energy storage units equals to or exceeds a power limit, wherein the power limit corresponds to a power of the battery energy storage system and/or the component connected thereto, and
  - such that states of charge of the selected plurality of battery energy storage units are within a determined range, which indicates a range of variation of the states of charge of the select plurality of battery energy storage units;
- control the switching arrangement to couple only the selected plurality of battery energy storage units to the DC power connection; and
- after the coupling of the selected plurality of battery energy storage units to the DC power connection, control the battery energy storage system to start charging or discharging the selected plurality of battery energy storage units coupled to the DC power connection.

* * * * *